Patented Aug. 6, 1935

2,010,773

UNITED STATES PATENT OFFICE 2,010,773

PROCESS FOR PRODUCING SYNTHETIC RESINS AND PRODUCT THEREFROM

Stephen P. Burke, Plainfield, and Henry M. Enterline, Elizabeth, N. J., assignors to Combustion Utilities Corporation, New York, N. Y., a corporation of Maine No Drawing. Application August 22, 1929, Serial No. 387,785

17 Claims. (Cl. 260—4)

This invention relates to the preparation of synthetic resins, and more especially it concerns the production of potentially reactive synthetic resins by a novel treatment with a suitable condensing agent of mixtures containing a substance relatively highly reactive to the condensing agent but yielding a condensation product which is not completely curable by heat or an equivalent curing treatment, and also containing a substance which has a relatively lower degree of reactivity with respect to the said condensing agent but which gives a condensation product that is substantially entirely curable by the application of heat or of heat and pressure.

The invention is of especial utility in connection with the preparation of resinous condensation products of high quality from low temperature tar acids and mixtures of or containing such tar acids by a suitable treatment thereof with aldehyde containing substances and the like, with or without the employment of a catalyst for the condensation reaction.

It is well known that phenol may be caused to react with formaldehyde in the presence of an alkaline catalyst to produce potentially reactive resins which are fusible and soluble but may be rendered infusible and insoluble by suitable heat treatment. It is also known that resins of this general type may be obtained from suitable low temperature tar distillates and the like by treatment with aldehyde-containing substances in the presence of catalysts.

In the usual process for the production of phenol-formaldehyde resins by reaction of phenol and formaldehyde, the said reaction progresses in the liquid mixture at a comparatively low rate of speed during the initial stages thereof, so that it may be readily controlled during such stages. However, during the latter part of the said reaction, the rate of conversion of the thus formed initial of "bakelite A" product is so high as to make it difficult to prevent the intermediate reaction product from being further converted into the final or "bakelite C" stage. To overcome this difficulty many expedients have been tried such as, for example, the employment of a two-stage formaldehyde treatment in which only a portion of the formaldehyde necessary for completion of the reaction and the formation of a hardenable resin is effected in the first stage of treatment. The non-curable intermediate product thus obtained must then be mixed with additional aldehyde-producing material in dry form, such as hexamethylene tetramine, which is always a more expensive source of formaldehyde than is aqueous formalin.

In preparing synthetic resins by the formaldehyde treatment of tar acid mixtures obtained from low temperature tar, it has been observed that the course of the reaction is quite dissimilar to the reaction described above where phenol is used. The tar acids from low temperature tar evidently react very rapidly at first with the formaldehyde, so that the "bakelite A" stage of synthetic resin is quickly obtained. The speed of the reaction, which here may be regarded as a continuous one, thereafter appears to fall off, so that the time required for curing the resins produced by the formaldehyde treatment of such tar acids and the like is relatively long compared with that required to fully cure resins prepared from phenol and some of the other lower boiling phenols. Moreover these tar acid resins do not appear to be completely curable by heat alone, under conditions normally suitable for curing the same type of resins produced from phenol. The non-curing portion of the resin is soluble in acetone and similar solvents, and may be removed from the curable portion thereof by an acetone extraction of the heat-treated mixture. For example, whereas resins produced from phenol by suitable formaldehyde treatment are totally insoluble in acetone after a heat-curing treatment, the resins produced in a similar manner from low temperature tar acids, after a similar heat-curing step, have an acetone-soluble portion which varies from 15 to 35%, depending upon the conditions of the preparation of the resin.

Among the principal objects of the present invention are to provide for the production of a synthetic, potentially-reactive resin of high quality suitable for use in the preparation of laminated products, molding materials and the like from materials normally unsuitable for such purposes; to produce from coal tar distillates and from the tar acid components of low temperature tars or materials containing the same or other tars, potentially reactive resins which are substantially insoluble in acetone and similar solvents after exposure to suitable curing heat; to provide in an improved manner for substantially reducing the non-curable portion of synthetic resins prepared by an aldehyde treatment of low temperature tar acids and materials containing the same; to provide in an improved manner for preparing a potentially reactive synthetic resin from phenol and formaldehyde whereby the initial reaction between these components is speeded up and the tendency of the initial reaction product to proceed into the "bakelite C" type is substantially reduced; to provide for producing a satisfactory potentially reactive synthetic resin from a mixture of the total tar acids normally present in low temperature tar. These and other objects will be apparent from an inspection of the following disclosure of the specification and claims.

According to one form of the present invention, mixtures containing phenol and the tar acids from low temperature tar are subjected to a treatment with an aldehyde-containing substance such as formaldehyde, preferably under the influence of heat and in the presence of a suitable catalyst, such as sodium hydroxide. The amount of formaldehyde employed is generally slightly more than 1 mol per mol of total phenolic body including the tar acid fraction employed. The said mixture is then heated to approximately the boiling temperature and kept at this point until the condensation reaction has occurred. The heat treatment however is not essential, and the reaction will occur in the cold if sufficient time is allowed therefor. The liquid mixture substantially increases in viscosity during the course of the reaction.

According to another form of the invention, the phenol or phenolic substance is first treated alone with a suitable amount of formaldehyde and, after a limited heat treatment of the reaction mixture to initiate the condensation reaction, the liquid containing the tar acids is added thereto, together with additional formaldehyde in amount sufficient to bring the total formaldehyde content to the point required to induce complete interaction and produce the desired resins. The relative amounts of phenolic body and of aldehyde-containing material is variable within rather wide limits,—but it is preferable to employ a slightly greater amount of the latter than is sufficient to give equimolecular amounts of these substances. The resinous products obtained at this stage of the process are readily fusible and are soluble in the usual organic solvents, but they are potentially highly reactive and, when subjected to heat in the usual well known manner, are converted into infusible resins which are substantially insoluble in the usual solvents, and are especially suitable for use in connection with the preparation of laminated products, molding compositions as well as insulating materials, varnishes, cements and the like.

In still another form of the invention a coal tar oil or a distillate thereof is employed which, when treated with formaldehyde and a catalyst in the usual manner in carrying out the bakelizing reaction, ordinarily yields a potentially reactive resin only about 80% of which is curable. To such a coal tar or distillate is added a relatively small amount of a phenolic substance such as phenol or metacresol prior to the usual aldehyde treatment thereof. The final reaction mixture separates upon standing into 3 immiscible layers, and the resinous condensation product forming one of the said layers is substantially completely curable upon heating to the usual curing temperatures either alone or mixed with fillers, accelerators, modifying agents, and the like.

Various fillers and the like such as organic or inorganic fibrous, cellulosic or other materials, or plasticizing agents, hardening agents, and the like may be incorporated with the resin at any stage prior to the final heat treatment by which it is rendered infusible and insoluble. Such filling materials and the like may be added to the mixture of phenolic bodies and aldehyde at the time of the intermixture of the latter two substances, or they may be added to one or more of the components of the said mixture prior to that time. Upon subsequently subjecting the said mixture either containing or free from the said materials, to the action of heat or to the combined action of heat and pressure, the resin will first fuse and flow, and after further heating the mixture becomes hard, insoluble and infusible.

In place of the tar acid mixture, extremely satisfactory synthetic resins may be obtained by substituting an alkaline phenolate solution of such tar acids; and the tar acids or phenolate solution of tar acids employed may be those high boiling tar acids derived from the distillates of either low temperature coal tar or high temperature coal tar. Such tar acids may have normal boiling ranges as high as 300° C. or higher. In place of phenol there may be substituted a somewhat higher boiling phenol or phenol homologues such as cresol, meta cresol, cresylic acid, mixtures thereof or containing the same, or an alkaline phenolate solution prepared by treatment of such materials with caustic alkali or its equivalent.

By pretreating phenol with formaldehyde and,—after the condensation reaction is at least partially completed,—adding a phenolate solution of tar acids together with more formaldehyde under the conditions herein described, a highly satisfactory resinous product can be obtained from a reaction mixture in which the phenol or its equivalent and the total tar acids obtained from low temperature tar are in the proportion of 1 of the former to 6 of the latter by weight.

It is not however essential to partially complete the condensation reaction between the phenol and formaldehyde before adding the phenolate solution of high boiling tar acids to the said mixture and continuing the treatment. Very satisfactory results have been obtained by mixing together the phenol and the tar acids or phenolate solution of tar acids and thereafter condensing the mixture in the well known manner by treatment with an aldehyde-containing substance in the presence of suitable heat. The time required for the initial condensation reaction between the phenol and formaldehyde is variable within rather wide limits. Although in the following examples this time is generally indicated as 1 hour, yet it is readily possible to reduce this time for example, to 15 minutes and less, with substantially no depreciation in the character of the final product. The resultant phenol-formaldehyde resin at this stage is in the potentially reactive form and is capable of being converted by suitable heat treatment to the "bakelite C" form prior to the addition of the tar acids and further condensation with formalin.

While it is preferable to employ a strongly alkaline catalyst, such as caustic soda, other suitable catalysts which are more weakly alkaline, such as sodium carbonate or ammonia may be employed.

The following examples of preferred modifications of the process are presented for purposes of illustration only, and they are in nowise to be regarded as constituting limitations upon the scope of the invention, which is clearly defined in the appended claims.

Example 1

Treatment of a mixture of phenol and low temperature tar acids with formaldehyde, using small amounts of caustic soda as catalyst.

47 grams of phenol (.5 mol) were treated with 45 cc. of U. S. P. formalin (.55 mol of fromaldehyde) and 10 cc. of a 15% sodium hydroxide solution. The mixture was then boiled for an hour. 225 grams of tar acids (1.5 mols) obtained from a low temperature tar distillate boiling below 300° C. were then added to the mixture, together with 135 cc. of formalin (1.65 mols of formaldehyde) and 15 cc. of 15% sodium hydroxide solution. The mixture was boiled for an additional hour after which it was cooled and the water layer which formed was decanted. The resultant resin, after being dried and thickened by heating for 50 minutes to temperatures in the neighborhood of 60°–100°C., was a clear brittle solid. When cured by heating at 180° C. this resin had a solubility in acetone of but 2.1% and was infusible.

Example 2

188 grams of phenol (2 mols) were mixed with 180 cc. of U. S. P formalin (2.2 mols formaldehyde) and 25 cc. of 15% sodium hydroxide solution. This mixture was then boiled for one hour to initiate the condensation reaction, following which it was diluted with 530 cc. of 15% sodium hydroxide solution, (2 mols NaOH) and water was added to dilute the mixture to 1200 grams. 450 grams of this diluted mixture (corresponding to .75 mol of phenol), were mixed with 1230 cc. of an alkaline phenolate solution containing the tar acids (3 mols) from low temperature tar distillate having a boiling range up to 300° C. and 270 cc. of formalin (3.3 mols of formaldehyde). The mixture was boiled for 1½ hours and then diluted with hot water. The resultant solution was slightly acidified at 60° C. With a 10% sulfuric acid solution, and the granular resin thus precipitated was filtered off and dried in a vacuum at 85–90° C. The above mentioned phenolate solution contained about 366 grams of tar acids (having an average molecular weight of about 150) per litre of solution, and was prepared by agitating the tar distillate referred to above with a 15% caustic alkali solution in the cold. The resin produced was highly reactive, and after being cured at 180° C. for 30 minutes it showed a solubility in acetone of only 5.2%. Laminated plates prepared from a solution of this resin in a 50–50 alcohol-benzol mixture showed a modulus of rupture after curing which was substantially equivalent to that obtained with lacquers produced from the formaldehyde treatment of pure phenol by the usual processes. Laminated plates prepared in conjunction with this resin failed to show any noticeable tendency to dis-lamination after soaking for several days in acetone. The step of diluting the initial phenol-formaldehyde condensation product with an alkaline solution may be eliminated if the phenolate solution of tar acids contains sufficient alkali to render the entire mixture alkaline when added to the said initial condensation product.

Example 3

This example describes a simultaneous treatment of a mixture of cresylic acid and a phenolate solution of low temperature tar acids with formaldehyde. 88 grams (.75 mol) of cresylic acid were mixed with 200 cc. of a 15% sodium hydroxide solution. (.75 mol of NaOH), 835 cc. of an alkaline phenolate solution of low temperature tar acids having a boiling range up to 300° C. and containing 2.25 mols of tar acids, and 270 cc. of U. S. P. formalin (3.3 mols of formaldehyde). This mixture was boiled for 1 hour, following which it was diluted with water and acidified with dilute sulfuric acid to precipitate the resin. This resin, when cured at 180° C. for thirty minutes, had an acetone solubility of 7.6% and was in the infusible form. Such product is very satisfactory for use in the manufacture of laminated products. It has been observed generally that synthetic resins which after treatment at 180° C. for thirty minutes show a solubility in boiling acetone of less than 10%,—(upon being treated with such acetone for 4 hours or longer),—usually give laminated products which are not dis-laminated even when immersed in acetone during several days.

After the precipitation of the resin mixture by means of acid in the manner hereinbefore described, the precipitated resin is preferably washed once or twice with water for the purpose of removing therefrom the soluble impurities, such as sodium salts and the like, after which it filtered from the liquid and dried preferably in vacuum at a temperature below that at which the resin is injuriously affected by such heat treatment. Temperatures below 100° C. are usually suitable.

By the term "low-boiling phenol" and similar expressions used in the claims it is intended to designate phenol, cresol, meta cresol, cresylic acid, mixtures thereof or containing the same, or an alkaline phenolate solution prepared by the treatment of such materials with caustic alkali or its equivalent. Likewise by the expression "high-boiling tar acids" and similar expressions in the claims, it is intended to designate tar acids and mixtures thereof which have boiling points above those of phenol and the cresols, or oils containing the same.

In the preparation of the improved synthetic resin according to the present invention, other aldehydes or bodies containing one or more active methylene groups may be substituted for the formaldehyde. Moreover, other intermediate resinous condensation products, such as urea-formaldehyde condensation products, "glyptal" resins and the like, may be substituted for the intermediate condensation product of phenol and formaldehyde, to which the tar acid-containing mixture is then added.

As previously indicated, it is not essential that relatively pure tar acids be used in producing the curable synthetic resin according to the present invention. For example, a resin which was 99.3% curable was produced by a direct treatment of a low temperature coal tar distillate having a boiling range up to 300° C. to which had been added phenol in amount equal to ¼ the amount of the tar acid components of the said distillate, together with slightly more than a mol of formalin for each mol of the combined tar acid-phenols, and the addition of a small amount of sodium hydroxide as a catalyst. After boiling the mixture for ½ hour, and settling,—the supernatant water and oil layers were decanted off, and the resin layer thickened to the desired degree by heating it at temperatures sufficiently low to prevent conversion of the resin to the insoluble, infusible stage. (The heating may be performed under vacuum.) Equally satisfactory products are obtainable by the two-stage method in which the relatively low boiling phenolic body is subjected to an initial condensation treatment to form an intermediate resinous product and to which the tar acid-containing distillate is thereafter added together with additional formaldehyde and the condensation of the resin in the fortified reaction mixture is completed in well known manner. It will be noted that the non-curing portion of the synthetic resins in the preceding examples is, in each instance, far less than can be accounted for by the amount of curable phenol formaldehyde resin formed from the phenolic body added to the reaction mixture.

By the term "potentially reactive resins" and similar expressions are described those resins which, while capable of being produced in a form in which they are soluble both in aqueous solutions of strong alkalies and in the usual organic solvents such as acetone, alcohol, benzol-alcohol mixtures and the like, and which are readily fusible when exposed to suitable heat,—are also capable of being converted, by means of heat or by the combined effect of heat and pressure, into a form in which the resin is substantially insoluble in the usual organic solvents and is infusible when heated to or below its temperature of decomposition.

In carrying out the principles of the present invention we are able to accomplish the various objects thereof and to produce from coal tar and distillates thereof, or from the tar-acid components of such materials,—and especially from those tar acid-containing distillates and tar acid mixtures obtained from low temperature tar acid containing substantial amounts of tar acids boiling above 200° C.,—a high grade potentially reactive synthetic resin which is especially valuable in the manufacture of laminated products and molding compositions. The invention is susceptible of modification within the scope of the appended claims.

We claim:

1. The process of producing a potentially reactive resinous condensation product comprising the steps of producing an intermediate phenol-formaldehyde resin, adding thereto an alkaline solution of the high-boiling tar acid components of low temperature coal tar together with at least a molecular equivalent of formaldehyde, and reacting the said mixture.

2. The process of producing a potentially reactive resinous condensation product, which comprises treating a mixture of formalin and a phenol capable of reacting with formaldehyde to form completely curable condensation products until the resultant condensation reaction is substantially completed, and thereafter reacting the reaction mixture in the presence of an additional amount of an aldehyde and a liquid selected from the group consisting of a low temperature tar oil, a hydrocarbon distillate containing high-boiling tar acids, a mixture of high-boiling tar acids, and an alkaline solution of high-boiling tar acids.

3. The process of producing a potentially reactive resinous condensation product, which comprises reacting together in the presence of an alkaline catalyst, an aldehyde and a phenol capable of reacting with formaldehyde to form completely curable condensation products, thereby producing a mixture containing an intermediate resinous condensation product, thereafter adding an additional amount of aldehyde and the tar acid components of low temperature tar distillate having a boiling range up to 300° C., to form a second reaction mixture, heating the said reaction mixture to facilitate a condensation reaction between the components thereof, and the production of the desired condensation product, and recovering the latter from the mixture.

4. The process of producing a potentially reactive resinous condensation product, which comprises reacting with an aldehyde upon a low boiling phenol capable of reacting with formaldehyde to form completely curable condensation products, under conditions adapted to produce an intermediate resinous product but insufficient to convert the same into an infusible, insoluble resin, adding to the mixture a relatively large amount of an alkaline solution of high boiling tar acids obtained from a coal tar distillate boiling up to 300° C., together with an additional amount of aldehyde, heating the last-named mixture while maintaining an alkaline reaction therein, and thereafter recovering the resin thus formed.

5. The process as defined in claim 4 including the step of drying the resin at temperatures below 100° C.

6. The process of retarding the rate of conversion of a phenol-formaldehyde intermediate resinous product to the final "bakelite C" stage during the condensation reaction, which comprises heating together an aldehyde and a phenol capable of reacting with formaldehyde to form completely curable condensation products to produce an intermediate resinous condensation product, and diluting the latter while in the "bakelite A" stage with a liquid selected from the group consisting of low temperature tar oil, a hydrocarbon distillate containing high-boiling tar acids, a mixture of high-boiling tar acids, and an alkaline solution of high-boiling tar acids together with an additional amount of aldehyde while continuing the said heating until a potentially-reactive resinous product in the "bakelite A" state is produced, and separating the said product from the other components of the diluted mixture.

7. A potentially reactive resin which contains an intermediate product of the condensation reaction between formaldehyde and a low boiling phenol capable of reacting with formaldehyde to form a completely curable condensation product and which also contains an intermediate product of the condensation reaction between high boiling tar acids and an aldehyde carried out in the presence of the first-mentioned condensation product, the low boiling phenol and the high boiling tar acids being present in the proportion of one part of the former to not more than 6 parts of the latter.

8. A potentially reactive synthetic resin which upon curing is substantially insoluble in organic solvents such as acetone, the major portion of which resin comprises a phenol-formaldehyde resin having a relatively low rate of cure when submitted alone to a curing temperature, which resin is prepared by a formaldehyde treatment of a liquid selected from the group consisting of low temperature tar oil, a hydrocarbon distillate containing high-boiling tar acids, a mixture of high-boiling tar acids, and an alkaline solution of high-boiling tar acids, and which resin is normally not completely insoluble in solvents after such cure, and a minor portion of which comprises a phenol-formaldehyde resin having a relatively high rate of cure when submitted alone to the said curing temperature and which is substantially insoluble in solvents after such cure.

9. A potentially reactive synthetic resin which comprises a condensation product prepared by the reaction of an aldehyde upon a relatively low-boiling phenol capable of reacting with formaldehyde to form completely curable condensation products, and a condensation product prepared by the reaction of an aldehyde upon the high boiling tar acid components of low temperature coal tar in the presence of the first-mentioned condensation product, the said phenol and the tar acid components of the low temperature coal tar respectively being present in the proportion of one part of the former to not more than six parts of the latter.

10. A process for controlling the degree of curability of a synthetic resin of the phenol formaldehyde type prepared by the aldehyde treatment of a liquid containing high boiling tar acids and normally producing by the said treatment a resin possessing a substantial non-curing portion, which comprises the step of bringing into contact with the said liquid, at the initial stage of the aldehyde treatment thereof, a low boiling phenol capable of reacting with such an aldehyde to produce a completely curable resin.

11. The process of producing a potentially-reactive resin which upon curing is substantially insoluble in acetone, which comprises initiating a condensation reaction between a formaldehyde solution and a low-boiling phenol capable of reacting with formaldehyde to form completely curable condensation products, and completing the said condensation reaction in the presence of the reaction product formed by the condensation with formaldehyde of the high boiling tar acids of coal tar, the relative amounts of the said phenol and the said high boiling tar acids employed being in the ratio of one part of the former to not more than six parts of the latter.

12. The process of producing a potentially reactive resinous condensation product, which comprises reacting an aldehyde and a mixture containing both a low-boiling phenol capable of reacting with formaldehyde to form completely curable condensation products and the high boiling tar acids of low temperature coal tar, the said low-boiling phenol being present in substantial but smaller amounts than the said high boiling tar acids.

13. The process of producing a potentially reactive resinous condensation product, which comprises reacting with an aldehyde upon a low boiling phenol and high boiling tar acids derived from low temperature tar, the said low boiling phenol being present in amount at least one-sixth of the amount of the high boiling tar acids present.

14. The process of producing a potentially-reactive resinous condensation product which comprises heating and reacting with formaldehyde a liquid selected from the group consisting of a low temperature tar oil, a hydrocarbon distillate containing high-boiling tar acids, a mixture of high-boiling tar acids, and an alkaline solution of high boiling tar acids, and incorporating in the reaction mixture a low-boiling phenol capable of reacting with formaldehyde to form completely curable condensation products, the said low boiling phenol being present in the range of from one-third to two-thirds the amount of the high-boiling tar acids present therein.

15. The process for controlling the degree of curability of a synthetic phenol aldehyde resin prepared by the aldehyde treatment of a liquid selected from the group consisting of a low temperature tar oil, a hydrocarbon distillate containing high boiling tar acids, a mixture of high-boiling tar acids, and an alkaline solution of high-boiling tar acids, which comprises adding to the said liquid a low boiling phenol in amount substantially less than the total high-boiling tar acids present, and reacting the resultant mixture with at least an equi-molecular amount of formaldehyde.

16. The process of producing a potentially-reactive resinous condensation product, which comprises reacting an aldehyde in the presence of an alkaline catalyst with a liquid selected from the group consisting of a low temperature tar oil, a hydrocarbon distillate containing high-boiling tar acids, a mixture of high-boiling tar acids, and an alkaline solution of high-boiling tar acids, to which liquid has been added a low-boiling phenol in substantial amount but less than the amount of the high-boiling tar acids present.

17. The process of producing a potentially reactive resinous condensation product, which comprises reacting with a molecular excess of formaldehyde upon a mixture of tar acids having a boiling range of 200° C. to 300° C. and a low-boiling phenol present in amount at least one sixth by weight of the amount of high boiling tar acids.

STEPHEN P. BURKE.
HENRY M. ENTERLINE.